United States Patent Office 3,759,907
Patented Sept. 18, 1973

3,759,907
3 - (α-SUBSTITUTED AMINO-β-ALKOXYBENZOXY-PROPYL)-6,7- OR 6,7,8-ALKOXY - 1,2,3-BENZO-TRIAZINE-4(3H)-ONES
Adolf Stachel, Deceased, by Ingeburg Lydia Katharina Stachel, widow and heiress-at-law, Offenbach am Main, Rudi Beyerle, Bruchkobel, Rolf-Eberhard Nitz, Bergen-Enkheim, and Klaus Resag and Eckhard Schraven, Frankfurt am Main-Fechenheim, Germany; said Beyerle, Nitz and Schraven assignors to Cassella Farbwerke Mainkur Aktiengesellschaft, Frankfurt am Main-Fechenheim, Germany
No Drawing. Original application May 18, 1970, Ser. No. 38,544, now Patent No. 3,706,739. Divided and this application June 22, 1972, Ser. No. 265,225
Claims priority, application Germany, May 22, 1969, P 19 26 075.4
Int. Cl. C07d 55/08
U.S. Cl. 260—248 AS    3 Claims

ABSTRACT OF THE DISCLOSURE

The present invention pertains to new, pharmacologically valuable basically substituted 1,2,3-benzothiazine-4(3H)-one derivatives having excellent coronary dilator properties and which have the structural formula

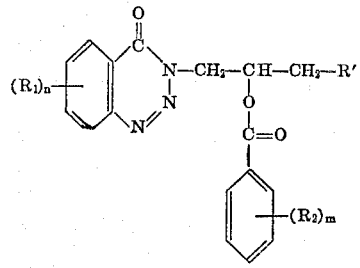

wherein R' is a N-methyl-N-cycloalkylamino radical, cycloalkyl having 3–6 carbon atoms, said radical being bound via its nitrogen atom; $R_1$ is a lower alkoxy group having 1–4 carbon atoms which may be in the 6,7 or 6,7,8-position; $R_2$ is an alkoxy group having 1–4 carbon atoms; $m$ is an integer selected from 1, 2 and 3; and $n$ is an integer selected from the group consisting of 2 and 3 and pharmaceutically acceptable acid addition salts thereof.

The present invention relates to new, pharmacologically valuable basically substituted 1,2,3-benzotriazine-4(3H)-one derivatives having the general formula

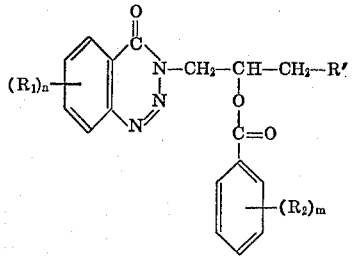

wherein

R' is a radical selected from the group consisting of a secondary aliphatic, cycloaliphatic, araliphatic amine having 2 to 10 carbon atoms or of a 5, 6 or 7-membered heterocyclic nitrogen base, which contains in the nucleus besides the nitrogen atom a corresponding number of methylene groups as well as a further nitrogen atom, an O or an S atom, said radical being bound via a nitrogen atom, $R_1$ stands for lower alkoxy groups having 1 to 4 carbon atoms which may be in the 6,7 or 6,7,8-position, $R_2$ represents alkoxy having 1 to 4 carbon atoms,
$m$ stands for the integers 1, 2 or 3 and
$n$ means the integers 2 or 3.

Furthermore, the present invention relates to processes for the production of said compounds.

The present application is a division of our U.S. Ser. No. 38,544, filed May 18, 1970, now U.S. Pat. No. 3,706,739.

The radical of a secondary amine R' which is bound via a nitrogen atom may derive in the aliphatic series from mono and diamines, such as dialkylamines, alkylalkenylamines, alkylenediamines, hydroxyalkylamines and alkoxyalkylamines.

Such amines are for instance: dimethylamine, diethylamine, allylmethylamine, N,N-diethyl-N'-methylethylenediamine, N,N-diethyl-N'-methylpropylenediamine, N-methylethanolamine, N-methylpropanolamine, N-isopropylethanolamine, N-butylethanolamine, N-benzylethanolamine, N-methylmethoxypropylamine, N-methylethoxypropylamine.

Cycloaliphatic amines may be for instance: N-methylcyclopropylamine, N-methylcyclohexylamine.

Amines of the araliphatic series may be for instance: phenalkylalkylamines such as benzylmethylamine, phenethylmethylamine.

Heterocyclic nitrogen bases may be for instance: 5, 6 and 7-membered heterocyclic nitrogen bases such as pyrrolidine, morpholine, thiomorpholine, piperidine, N-methylpiperazine, N-phenylpiperazine, N-(β-hydroxyethyl)-piperazine, N-(γ-hydroxypropyl)-piperazine, hexamethyleneimine.

The 1,2,3-benzothiazine-4(3H)-one derivatives of the present invention are obtained by (a) Acylating, optionally in the presence of an acid-binding agent, 1,2,3-benzotriazine-4(3H)-one derivatives of the general formula

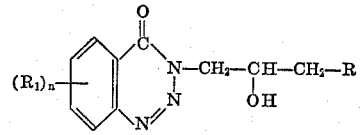

wherein $R_1$ has the above-given meaning, R is identical with R' or, in case R' contains an acyloxy radical of the general formula

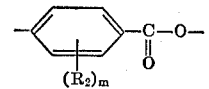

said R may represent the residue of the underlying hydroxy compound, with an alkoxy benzoic acid of the general formula

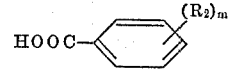

or a functional derivative thereof, or (b) Cyclizing substituted o-aminobenzamides of the general formula

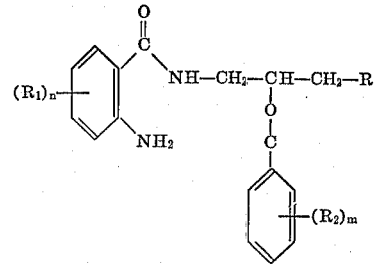

with nitrous acid.

If, according to the process described under para. (a), initial products are used wherein the radical of an amine R, which is bound via a nitrogen atom, contains a hydroxyalkyl group, and if 2 mols of alkoxy benzoic acid or of a functional derivative thereof are employed, one obtains the corresponding diesters. The 3-($\gamma$-amino-$\beta$-hydroxypropyl)-1,2,3-benzotriazine-4-(3H)-ones required as starting material may be obtained by various ways of preparation according to the teachings of the corresponding application having the same title and the same filing date.

The initial products required for the process described under para. (b) may be prepared in the usual manner according to known per se processes. The nitrous acid which causes the cyclization is formed in an acid reaction medium from the alkali metal nitrites employed.

The 1,2,3 - benzotriazine-4(3H)-one derivatives of the present invention are valuable pharmaceuticals. In particular, they are excellent coronary dilators and, in this respect, superior to other known substances of this kind.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schaper, R. Xhonneux, and J. M. Boggard "Uber die kontinuierliche Messung des Sauerstoffdruckes im venösen Coronarblut" (Naunyn-Schmiedeberg's Arch. exper. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Luebbers "Die Messung des Sauerstoffdruckes in Gasen und Flüssigkeiten mit der Platin-Elektrode unter be sonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective hydrochlorides:

| Preparation | LD$_{50}$ g./kg., mouse, i.v. | Dosage, mg./kg., i.v. | Maximal increase in oxygen tension in the coronary veinous blood in— | | Maximal change in the heart rate in— | | Maximal change in the blood pressure (systolic/diastolic) in— | |
|---|---|---|---|---|---|---|---|---|
| | | | Percent | Minutes | Percent | Minutes | Percent | Minutes |
| 3-[$\gamma$-morpholino-$\beta$-(3,4,5-trimethoxybenzoxy)-propyl]-6,7,8-trimethoxy-1,2,3-benzotriazine-4(3H)-one | 0.2 | 0.5 | +106 | >25 | −19 | >25 | −43/−32 | >25 |
| 3-[$\gamma$-(4'-$\beta$-3,4,5-trimethoxybenzoxyethylpiperazino)-$\beta$-(3,4,5-trimethoxybenzoxy)-propyl]-6,7,8-trimethoxy-1,2,3-benzotriazine-4(3H)-one | 0.25 | 0.5 | +109 | >60 | −5 | 20 | −22/−31 | >60 |
| 3-[$\gamma$-morpholino-$\beta$-(3,5-dimethoxybenzoxy)-propyl]-6,7,8-trimethoxy-1,2,3-benzotriazine-4(3H)-one | >0.25 | 0.5 | +57 | >15 | +23 | >15 | −25/−19 | >15 |
| 3-[$\gamma$-morpholino-$\beta$-(3,5-dimethoxy-4-n-butoxybenzoxy)-propyl]-6,7,8-trimethoxy-1,2,3-benzotriazine-4(3H)-one | >0.4 | 0.5 | +55 | 40 | −10 | >40 | −32/−25 | 35 |
| 3-[$\gamma$-piperidino-$\beta$-(3,4,5-trimethoxybenzoxy)-propyl]-6,7,8-trimethoxy-1,2,3-benzotriazine-4(3H)-one | 0.1 | 0.5 | +25 | 35 | −5 | >35 | +6/−12 | 15 |
| 3-[$\gamma$-hexamethyleneimino-$\beta$-(3,4,5-trimethoxybenzoxy)-propyl]-6,7,8-trimethoxy-1,2,3-benzotriazine-4(3H)-one | 0.13 | 0.5 | +19 | >30 | −12 | >30 | −4/−18 | 20 |
| 3-[$\gamma$-(4'-methylpiperazino)-$\beta$-(3,4,5-trimethoxybenzoxy)-propyl]-6,7,8-trimethoxy-1,2,3-benzotriazine-4(3H)-one | 0.24 | 2.0 | +65 | >65 | −5 | >65 | −7/−14 | 15 |
| 3-[$\gamma$-(4'-phenylpiperazino)-$\beta$-(3,4,5-trimethoxybenzoxy)-propyl]-6,7,8-trimethoxy-1,2,3-benzotriazine-4(3H)-one | >0.25 | 0.5 | +17 | >15 | −3 | >15 | −4/−6 | >15 |
| 3-[$\gamma$-pyrrolidino-$\beta$-(3,4,5-trimethoxybenzoxy)-propyl]-6,7,8-trimethoxy-1,2,3-benzotriazine-4(3H)-one | 0.043 | 0.5 | +79 | >80 | −11 | >80 | ±0 | |
| 3-[$\gamma$-(N-methyl-N-$\gamma$-methoxy propylamino)-$\beta$-(3,4,5-trimethoxybenzoxy)-propyl]-6,7,8-trimethoxy-1,2,3-benzotriazine-4(3H)-one | | 0.5 | +138 | >240 | −13 | 35 | −35/−36 | 35 |
| 3-[$\gamma$-(N-methyl-N-$\gamma$-diethylaminopropylamino)-$\beta$-(3,4,5-trimethoxybenzoxy)-propyl]-6,7,8-trimethoxy-1,2,3-benzotriazine-4(3H)-one | 0.028 | 2.0 | +267 | >155 | −15 | >155 | −51/−48 | >155 |
| 3-[$\gamma$-(N-methyl-N-benzylamino)-$\beta$-(3,4,5-trimethoxybenzoxy)-propyl]-6,7,8-trimethoxy-1,2,3-benzotriazine-4(3H)-one | 0.17 | 0.5 | +128 | >70 | −21 | >70 | −27/−35 | >70 |

For a better understanding of the nature and the objects of this invention, reference should be made to the accompanying examples which are of an illustrative rather than, a limiting nature. Unless otherwise stated, all temperatures given are in degrees centigrade.

EXAMPLE 1

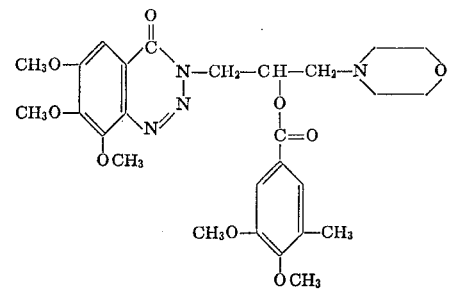

38.0 g. (0.1 mol) 3-($\gamma$-morpholino-$\beta$-hydroxy-propyl)-6,7,8 - trimethoxy-1,2,3-benzotriazine-4(3H)-one are dissolved in 250 cc. anhydrous benzene and 11.1 g. (0.11 mol) triethylamine are added. Subsequently, a solution of 25.3 g. (0.11 mol) 3,4,5-trimethoxybenzoyl chloride in 100 cc. anhydrous benzene are added dropwise while stirring at room temperature during 30 minutes and stirring is continued for 2 hours at room temperature. The reaction mixture is then stirred for another 6 hous under reflux and sucked off, while hot, from the triethylamine hydrochloride being precipitated. The filtrate is washed with water, with a 10% aqueous sodium bicarbonate solution and again with water and finally dried over anhydrous sodium sulfate. Subsequently, the solvent is distilled off at 50° in the water-jet vacuum. The residue, a colorless crystal powder, is triturated with little ethyl acetate and sucked off. By recrystallization from ethyl acetate one obtains the 3 - [$\gamma$-morpholino-$\beta$-(3,4,5-trimethoxybenzoxy)-propyl] - 6,7,8-trimethoxy-1,2,3-benzotriazine-4(3H)-one in the form of colorless crystals having a melting point of 142–144°.

Yield: 48 g.(=84% of the theoretical)

EXAMPLE 2

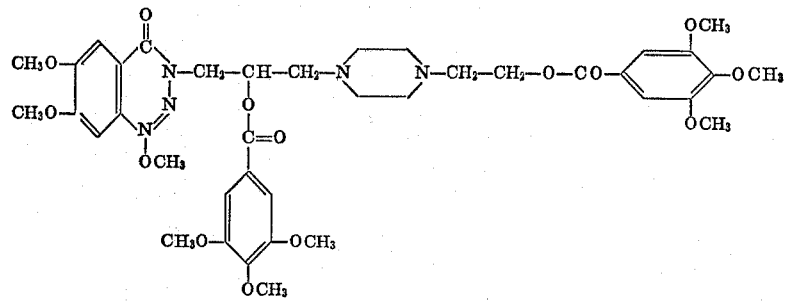

49.6 g. (0.1 mol) 3-[γ-(4'-β-hydroxyethylpiperazino[1'])-β - hydroxy-propyl]-6,7,8-trimethoxy-1,2,3-benzotriazine-4(3H)-one dihydrochloride are dissolved in 500 cc. anhydrous chloroform with the addition of 40.4 g. (0.4 mol) triethylamine. A solution of 46 g. (0.2 mol) 3,4,5-trimethoxybenzoyl chloride in 150 cc. anhydrous chloroform is added dropwise while stirring within 1 hour. After the decay of the exothermic reaction stirring is continued for another 2 hours at 40–50°. The thusly obtained reaction mixture is first washed several times with water, then with a 10% aqueous sodium bicarbonate solution and again with water. Subsequently, the solvent is distilled off at 40° in the water-jet vacuum and the residue, a light yellow oil, is dissolved, for further purification purposes, in dilute aqueous hydrochloric acid. This solution is extracted with ether and filtered in order to become limpid. By the addition of potassium carbonate until the reaction mixture shows an alkaline reaction (pH 9), the diester being formed separates in the form of a colorless oil. It is extracted with ethyl acetate which is washed several times with water and dried over anhydrous sodium sulfate. The solvent is then distilled off at 40° in the water-jet vacuum and the residue, a colorless oil, is dissolved in anhydrous ether. By the addition of etheric hydrochloric acid until congo paper turns blue one obtains the dihydrochloride of the 3 - [γ - (4'-β-3,4,5-trimethoxybenzoxyethylpiperazino [1']) - β - 3,4,5-trimethoxybenzoxypropyl]-6,7,8-trimethoxy-1,2,3-benzotriazine-4(3H)-one in the form of colorless crystals decomposing at 150°. Yield: 70 g. (=79% of the theoretical)

Analogously to the description given in Examples 1 and 2 the following compounds of the present invention may be prepared:

General formula:

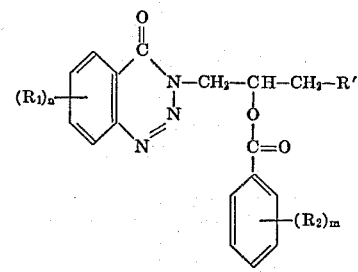

| $(R_1)_n$ | $(R_2)_m$ | R' | Melting point (hydrochloride), degrees |
|---|---|---|---|
| 6,7,8-(OCH₃)₃ | -OC-C₆H₂(OCH₃)₃ (3,4,5-trimethoxybenzoyl) | -N⟩O (morpholino) | 125 |
| Same as above | -OC-C₆H₂(OCH₃)₂(OC₄H₉) | Same as above | 115 |
| Do | -OC-C₆H₂(OC₂H₅)₃ | -N(C₂H₅)₂ | 200-202 |
| Do | -OC-C₆H₂(OCH₃)₃ | Same as above | 208-210 |
| Do | Same as above | -N⟩ (piperidino) | 190 |
| Do | do | -N⟩ (hexamethyleneimino) | 125 |
| Do | do | -N⟩N-CH₃ | [1] 160 |
| Do | do | -N⟩N-C₆H₅ | [1] 163 |

| $(R_1)_n$ | $(R_2)_m$ | R' | Melting point (hydrochloride), degrees |
|---|---|---|---|
| 6,7,8-$(OCH_3)_3$ | —OC—[benzene ring with $OCH_3$ at three positions] | —N[pyrrolidine ring] | 80 |
| Do | Same as above | $-\underset{\underset{CH_3}{\vert}}{N}-CH_2-CH_2-CH_2-O-CH_3$ | 130 |
| Do | do | $-\underset{\underset{CH_3}{\vert}}{N}-CH_2-CH_2-CH_2-N(C_2H_5)_2$ | [1] 75 |
| Do | do | $-\underset{\underset{CH_3}{\vert}}{N}-CH_2-C_6H_5$ | 75 |
| Do | do | $-\underset{\underset{CH_3}{\vert}}{N}-CH_2-CH=CH_2$ | 85 |
| Do | do | $-\underset{\underset{CH_3}{\vert}}{N}$—[cyclohexyl with H] | 85 |
| Do | do | $-\underset{\underset{CH_3}{\vert}}{N}-CH\underset{CH_2}{\overset{CH_2}{<}}$ | 95 |
| 6,7-$(OCH_3)_2$ | do | —N[morpholine ring with O] | 136–138 |
| Same as above | do | —N[piperidine ring] | 220 |
| Do | do | —$N(C_2H_5)_2$ | 195 |
| Do | do | $-\underset{\underset{CH_3}{\vert}}{N}-CH_2-CH=CH_2$ | 180 |
| Do | do | $-\underset{\underset{CH_3}{\vert}}{N}-CH_2-CH_2-CH_2-N(C_2H_5)_2$ | [1] 165 |
| Do | do | —N[piperazine]N—$CH_2$—$CH_2$OOC—[benzene with 3 $OCH_3$] | [1] 192 |

[1] Dihydrochloride.

EXAMPLE 3

2-nitro-3,4,5-trimethoxy-N-(γ-diethylamino-β-hydroxypropyl)-benzamide 82.6 g. (0.3 mol) 2-nitro-3,4,5-trimethoxybenzoyl chloride are dissolved in 200 cc. anhydrous benzene and added dropwise, while stirring, to a solution consisting of 43.8 g. (0.3 mol) γ-diethylamino-β-hydroxypropylamine and 30.3 g. (0.3 mol) triethylamine in 500 cc. anhydrous benzene. Stirring is continued for 3 hours under reflux and after cooling down, the filtrate is evaporated to dryness in vacuo. For further purification purposes the crude product is dissolved in dilute hydrochloric acid and, after filtration, the filtrate is rendered alkaline by the addition of an aqueous potassium carbonate solution. The base which hereby separates in the form of an oil, is dissolved in ethyl acetate and washed several times with water. After drying over potassium carbonate the the ethyl acetate solution is concentrated in vacuo and thus obtained is the 2- -nitro - 3,4,5-trimethoxy-N-(γ-diethylamino-β-hydroxypropyl)-benzamide in the form of a yellowish oil.

Yield: 91 g. (=79% of the theoretical).

2-nitro-3,4,5-trimethoxy-N-[γ-diethylamino-β-(3,4,5-trimethoxybenzoxy)-propyl]-benzamide 38.5 g. (0.1 mol 2-nitro-3,4,5-trimethoxy-N-(γ-diethylamino-β-hydroxypropyl)-benzamide and 15.15 g. (0.15 mol) triethylamine are dissolved in 200 cc. anhydrous benzene and admixed with stirring with a solution consisting of 34.5 g. (0.15 mole) 3,4,5 - trimethoxybenzoyl chloride in 150 cc. anhydrous benzene. Subsequently, the reaction mixture is heated to the boil and stirring is continued for 6 hours under reflux. After cooling down the reaction product is stirred out with 300 cc. water and the benzene layer is separated. Subsequently, the benzene layer is shaken out with dilute hydrochloric acid. The aqueous hydrochloric acid solution is rendered alkaline by the addition of aqueous potassium carbonate solution and the base which separates in the form of an oil is dissolved in ethyl acetate. The thusly obtained ethyl acetate solution is washed with water and evaporated to dryness, after drying over potassium carbonate, in vacuo. For further purification the crude product is recrystallized from alcohol. Thus obtained is the 2-nitro-3,4,5-trimethoxy-N-[γ - diethylamino-β-(3,4,5-trimethoxybenzoyl) - propyl]- benzamide in the form of light yellow crystals melting at 107°.

Yield: 46 g. (=79.5% of the theoretical).

2-amino-3,4,5-trimethoxy-N-[γ-diethylamino-β-(3,4,5-trimethoxybenzoyl)-propyl]-benzamide 58 g. (0.1 mol) 2-nitro-3,4,5-trimethoxy-N-[γ-diethylamino-β-(3,4,5-trimethoxybenzoxy) - propyl] - benzamide are dissolved in 250 cc. methanol and hydrogenated at 30–40° in the presence of Raney nickel at a hydrogen pressure of 70 atmospheres. The reaction product is sucked off from the catalyst and the filtrate is evaporated to dryness in vacuo. The oily residue is dissolved in ethyl acetate and by the addition of etheric hydrochloric acid the dihydrochloride of the 2 - amino-3,4,5-trimethoxy-N-[γ-diethylamino - β - (3,4,5 - trimethoxybenzoxy)-propyl]-benzamide is precipitated in the form of colorless needles having a decomposition point of 75°.

Yield: 49 g. (=78.7% of the theoretical).

3-[γ-diethylamino - β - (3,4,5-trimethoxybenzoxy)-propyl]-6,7,8-trimethoxy-1,2,3-benzotriazine-4(3H)-one 31 g. (0.05 mol) 2 - amino-3,4,5-trimethoxy-N-[γ-diethylamino-β-(3,4,5-trimethoxybenzoxy) - propyl] - benzamide dihydrochloride are dissolved in 100 cc. water and at 0–5° admixed dropwise while stirring and cooling with a solution consisting of 3.5 g. (0.05 mol) sodium nitrite in 20 cc. water. Stirring is continued for 2 hours at 0–5°, then the temperature is allowed to reach room temperature. After having stirred overnight, the reaction mixture is rendered neutral by the addition of aqueous sodium bicarbonate solution and the reaction product that precipitates in the form of crystals is sucked off. For further purification purposes it is then recrystallized from methanol. Thus obtained is the 3-[γ-diethylamino-β-(3,4,5-trimethoxy-benzoxy)-propyl]-6,7,8-trimethoxy - 1,2,3-benzotriazine-4(3H)-one in the form of colorless needles melting at 92–95°.

Yield: 22 g. (=78.6% of the theoretical).

What is claimed is:

1. A compound having the structural formula

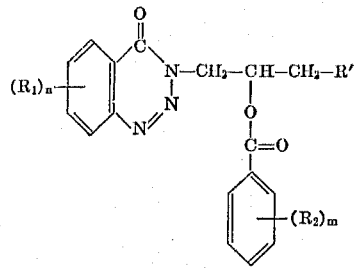

wherein R' is a N - methyl-N-cycloalkylamino radical, cycloalkyl having 3–6 carbon atoms, said radical being bound via its nitrogen atom; $R_1$ is a lower alkoxy group having 1–4 carbon atoms which may be in the 6,7 or 6,7,8-position; $R_2$ is an alkoxy group having 1–4 carbon atoms; $m$ is an integer selected from 1, 2 and 3; and $n$ is an integer selected from the group consisting of 2 and 3 and pharmaceutically acceptable acid addition salts thereof.

2. 3-[γ-(N-methyl - N - cyclopropyl-amino)-β-(3,4,5-trimethoxybenzoxy) - propyl] - 6,7,8 - trimethoxy-1,2,3-benzotriazine-4(3H)-one and pharmaceutically acceptable acid addition salts thereof.

3. 3-[γ-(N-methyl - N - cyclohexyl - amino)-β-(3,4,5-trimethoxybenzoxy)-propyl] - 6,7,8 - trimethoxy - 1,2,3-benzotriazine-4(3H)-one and pharmaceutically acceptable acid addition salts thereof.

References Cited

FOREIGN PATENTS 1,926,076  12/1970  Germany.

JOHN M. FORD, Primary Examiner

U.S. Cl. X.R.

424—249